United States Patent
Peak et al.

(10) Patent No.: US 9,672,492 B2
(45) Date of Patent: Jun. 6, 2017

(54) SYSTEM AND METHOD FOR DISTRIBUTING INSURANCE SOCIAL MEDIA RELATED INFORMATION

(75) Inventors: David F. Peak, Avon, CT (US); Benjamin O. Buswell, Granby, CT (US); Bryan Matthew Johnson, West Hartford, CT (US); Anil Vasagiri, Hamden, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 1181 days.

(21) Appl. No.: 13/103,681

(22) Filed: May 9, 2011

(65) Prior Publication Data

US 2012/0245963 A1    Sep. 27, 2012

Related U.S. Application Data

(60) Provisional application No. 61/466,726, filed on Mar. 23, 2011.

(51) Int. Cl.
G06Q 40/00    (2012.01)
G06Q 10/10    (2012.01)
G06Q 50/00    (2012.01)

(52) U.S. Cl.
CPC .............. *G06Q 10/10* (2013.01); *G06Q 50/01* (2013.01)

(58) Field of Classification Search
CPC ......... G06Q 40/00; G06Q 40/08; G06Q 50/01
USPC ............................................................. 705/4
See application file for complete search history.

(56) References Cited

U.S. PATENT DOCUMENTS

| | | | |
|---|---|---|---|
| 7,925,523 B1 | 4/2011 | McConnell et al. | |
| 9,483,795 B1 * | 11/2016 | Warden | G06Q 40/08 |
| 2001/0037265 A1 | 11/2001 | Kleinberg | |
| 2010/0318571 A1 * | 12/2010 | Pearlman et al. | 707/784 |
| 2010/0324941 A1 | 12/2010 | Stevenson et al. | |
| 2011/0145023 A1 | 6/2011 | Stahl et al. | |
| 2012/0095861 A1 * | 4/2012 | Feng et al. | 705/26.7 |

* cited by examiner

*Primary Examiner* — Lalita M Hamilton
(74) *Attorney, Agent, or Firm* — Howard IP Law Group, PC

(57) ABSTRACT

According to some embodiments, a system may detect an occurrence of a trigger event in connection with a first insurance agent of a plurality of insurance agents. For example, the system might detect that a person has added a friend on Facebook, changed his or her status, or that he or she is currently visiting a local coffee shop. Responsive to said detection, some embodiments may automatically post information to at least one social network server in connection with the first insurance agent. For example, an offer to meet at a particular location and/or a discount or other benefit associated with an insurance product might be posted or otherwise provided via one or more social networks.

23 Claims, 10 Drawing Sheets

| AGENT IDENTIFIER 802 | AGENT NAME 804 | AGENT ADDRESS 806 | SELECTED SOCIAL NETWORKS 808 | SELECTED INSURANCE PRODUCTS 810 |
|---|---|---|---|---|
| A101 | MS. BROWN | 555 BROADWAY NEW YORK, NY | FACEBOOK | AUTOMOTIVE |
| A102 | MR. GREENE | 123 MAIN STREET HARTFORD, CT | TWITTER | LIFE |
| A103 | MS. BLUE | (203) 555-1234 | FACEBOOK | AUTOMOTIVE |
| A104 | MR. WHITE | USERNAME: WHITE PASSWORD: **** | TWITTER | AUTOMOTIVE |
| A102 | MR. GREENE | 123 MAIN STREET HARTFORD, CT | TWITTER | 401(k) |
| A103 | MS. BLUE | (203) 555-1234 | FACEBOOK | PROPERTY |
| A104 | MR. WHITE | USERNAME: WHITE PASSWORD: **** | TWITTER | WORKERS COMPENSATION |

FIG. 8

| TEMPLATE IDENTIFIER 902 | SOCIAL NETWORK 904 | TEMPLATE ELEMENT 906 | ELEMENT LOCATION 908 | ELEMENT DATA 910 |
|---|---|---|---|---|
| T101 | FACEBOOK | AGENT PHOTOGRAPH | TOP RIGHT | G:/PROFILES/*.BMP |
| T101 | FACEBOOK | AGENT ADDRESS | TOP LEFT | AGENT REGISTRATION DB: AGENT ADDRESS |
| T101 | FACEBOOK | POSTING INFORMATION | BOTTOM HALF | NONE |
| T102 | FACEBOOK | AGENT PHOTOGRAPH | TOP LEFT | G:/PROFILES/*.BMP |

FIG. 9

| POSTING IDENTIFIER 1002 | POSTING TRIGGER 1004 | POSTING AGENT IDENTIFIER 1006 | SOCIAL NETWORK 1008 | POSTING INFORMATION 1010 |
|---|---|---|---|---|
| P101 | LOCATION = L01 | A101 | FACEBOOK | VISIT COFFEE HOUSE 4 FREE QUOTE AND DRINK! |
| P102 | TR101 | A102 | TWITTER | NEW PRODUCT AVAILABLE, CHECK OUT THIS VIDEO |
| P103 | NEW FRIEND ADDED | A109 | FACEBOOK | I'D LIKE TO WELCOME JOHN TO OUR GROUP |
| P104 | LOCATION NOT L01 | A101 | FACEBOOK | SORRY IF I MISSED YOU, LEAVING NOW! |
| P102 | DATE = BD | A102 | TWITTER | HAPPY BIRTHDAY TO JOHN DOE |
| P103 | LOCATION = L02 | A109 | FACEBOOK | JOHN, I'M AT STARBUCKS 2 BLOCKS AWAY |
| P104 | TR303 | A101 | FACEBOOK | YOUR FB FRIEND IS ONE OF MY CUSTOMERS |

*FIG. 10*

SYSTEM AND METHOD FOR DISTRIBUTING INSURANCE SOCIAL MEDIA RELATED INFORMATION

CROSS-REFERENCE TO RELATED APPLICATIONS

The present application claims the benefit of U.S. Provisional Patent Application No. 61/466,726 entitled "SYSTEM AND METHOD FOR DISTRIBUTING INSURANCE SOCIAL MEDIA RELATED INFORMATION" and filed on Mar. 23, 2011. The entire contents of that application are incorporated herein by reference.

BACKGROUND

A social network may include entities, such as insurance agents and potential customers. Moreover, the entities may be "linked" to other entities that, in turn, may be linked to still other entities. Social network entities may be "linked," for example, if they are friends or contacts on a social networking web site. Such social networks are an increasing popular way for people to communicate and exchange information with friends (and friends of friends, etc.). For example, an entity might post or otherwise display information about his or her current activities or interests to be automatically distributed to other entities in the social network (e.g., in accordance with the pre-established links).

In some cases, an insurance agent may be interested in distributing information associated with insurance products or services. For example, an insurance agent might be interested in letting potential clients know that he or she will be at a particular location (e.g., a local coffee shop) at a particular date and time in connection with a sponsored event. It can be difficult, however, to manually distribute such information, especially when a substantial number of potential clients and/or different social networks are involved.

It would be desirable to provide systems and methods to distribute information, including information associated with insurance products and services, by leveraging existing social networks.

SUMMARY OF THE INVENTION

According to some embodiments, systems, methods, apparatus, computer program code and means may be provided to automatically generate social network posting information responsive to a trigger event associated with an insurance agent.

A technical effect of some embodiments of the invention is an improved and computerized method of spreading insurance related information and a system providing improved communications to clients and/or potential clients. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 8 is a tabular portion of an agent registration database according to some embodiments.

FIG. 9 is a tabular portion of social network template database according to some embodiments.

FIG. 10 is a tabular portion of an event trigger and posting database according to some embodiments.

DETAILED DESCRIPTION

Figure 1:
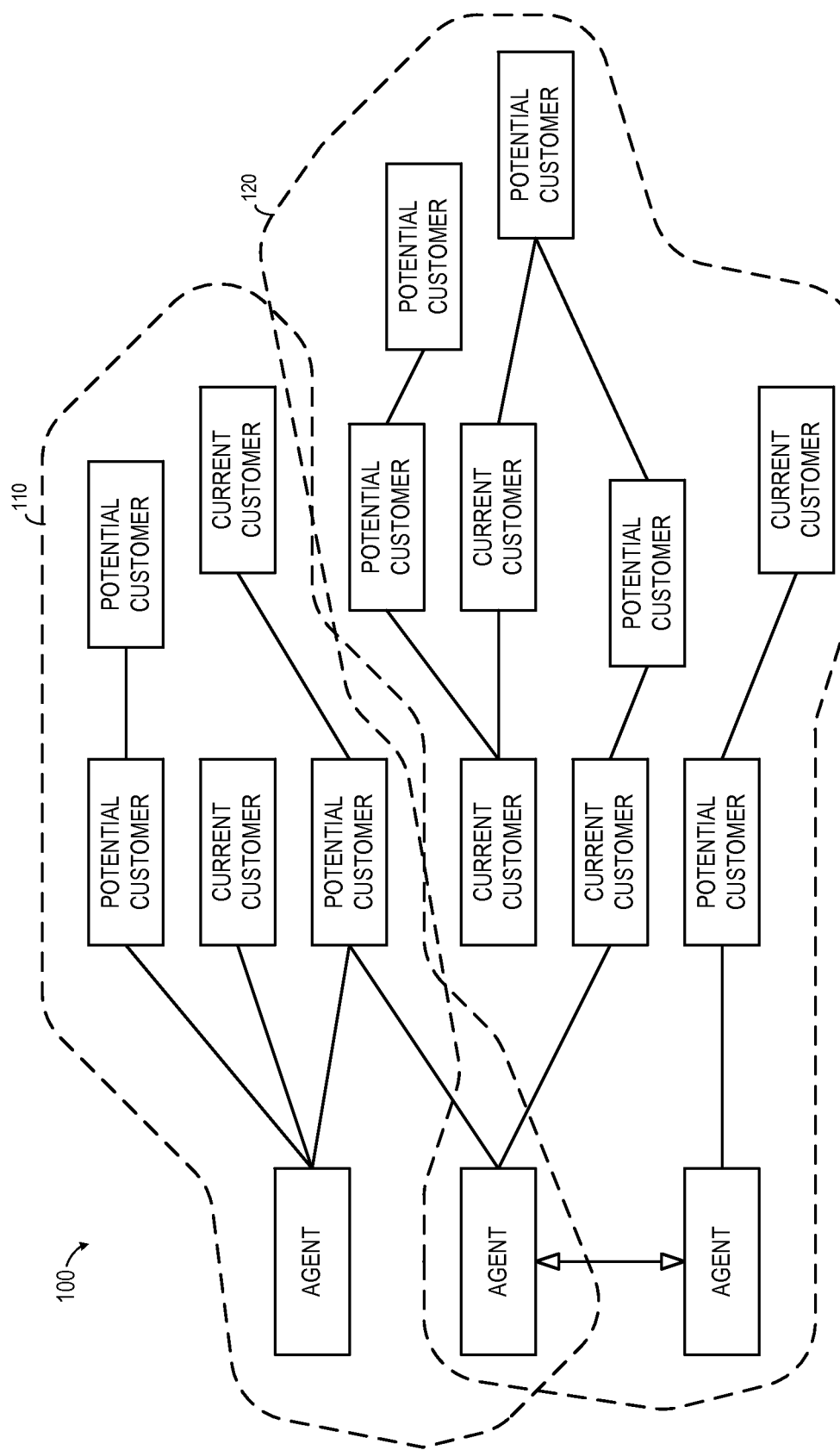
FIG. 1 illustrates social networks in accordance with some embodiments described herein.

FIG. 1 illustrates social networks 100 in accordance with some embodiments described herein. A social network might be associated with, for example, a community, business, or any other type of networking web site. In particular, a first social network 110 includes two agents who are each "linked" to potential customers who, in turn, may be linked to other potential customers. As use herein, two social network entities may be "linked," for example, if they are friends or contacts on a social networking site. Similarly, a second social network 120 includes two agents who are each "linked" to potential customers who, in turn, may be linked to other potential customers. Moreover, as used herein a "potential customer" may refer to any person or business that might purchase or otherwise be interested in an insurance product (including, for example, an existing customer who might be interesting in expanding or adjusting his or her current insurance policy). Note that according to some embodiments one agent may be linked to another agent. For example, two agents associated with the same insurance provider might be linked within a group in order to work together and share online leads.

As used herein, the term "agent" might refer to, for example, a licensed or registered person authorized to sell insurance products. The term agent might also refer to any of a broker, a registered independent agent, a producer, an entity (e.g., an agency), an insurance provider, a sales representative and/or an employee or affiliate of an agent. Moreover, any of the actions described here might be performed by a device associated with an agent (e.g., his or her vehicle or smartphone might automatically transmit location information to central server).

Note that a single entity (e.g., agent or potential customer) might be included in both social networks 110, 120. Such social networks 110, 120 are an increasing popular way for people to communicate and exchange information with friends (and friends of friends, etc.). For example, an entity might post or otherwise display information about his or her current activities or interests to be automatically distributed to other entities in the social network (e.g., in accordance with the pre-established links).

In some cases, an insurance agent may be interested in distributing information associated with insurance products or services. For example, an insurance agent might be interested in letting potential clients know that he or she will be at a particular location (e.g., a local coffee shop) at a particular date and time in connection with a sponsored event. It can be difficult, however, to manually distribute such information, especially when a substantial number of potential clients and/or different social networks are involved.

In some cases, an insurance agent may be associated with only a single insurance provider (sometimes referred to as a "captive" insurance agent). In other cases, an "independent" insurance agent may be associated with several different insurance providers. Note that embodiments described herein may be associated with either captive or independent insurance agents. With respect to independent insurance agents, any of the elements described herein may be further based on or otherwise associated with an insurance provider identifier. For example, the detection of trigger events and/or the posting information provided to social network sites might be performed based at least in part on an insurance provider identifier.

In some cases, an independent agent or its related social media accelerator platform (as described below) can have the ability to receive social media related information from multiple insurance carriers to use in the present invention. This may result in having too much information either being posted to an agent's social media website or distributed through the accelerator as described herein. Too much information could confuse or overwhelm the customer viewing his or her social media site. Therefore, the present invention allows for an agent related social media filter which can select which content would automatically be uploaded to the agent's website or distributed through the related accelerator platform received from the insurance carrier or it delegated data source. For example, the filter can select articles based on the date of origination or receipt by the agent, by the identity of the insurance provider, by the subject matter of the article. The article subject matter can be determined by associated transmission classification information or a key word search can also be used. The agent filter can also be preconfigured to only accept articles or other information related to certain lines of business, topics of interest, recent articles or information from a preferred insurance carrier. The agent filter can be implemented on a computer system as described in FIG. 7 and work in conjunction with the trigger events as described herein. The agent filter can be located at or as part of the agent's website, the accelerator platform or other portion of the overall system.

The agent's filter can also be dynamically updated based on feedback from the social media sites receiving the distributed content. For example, if a threshold number of customers indicate a dislike of certain content, that content can be reduced or eliminated by the filter. If a threshold number of customers indicate positive feedback, such as liking an article or giving a high rating, than the agent filter can be set to distribute the same or an increased number of information distributions with the same characteristics. This allows the agent to adapt the information delivery to his or her particular customers and prospective customers and better personalize the experience.

It should also be understood also that an insurance agent may offer some or all of the products in any of the insurance categories described herein. Note that an insurance "agent" might refer to a physical office wherein the agent may operate alone, or may instead have many producers in the office who are licensed to sell insurance. According to some embodiments, these licensed producers within an agency could also the system and methods described herein. In some cases, the producers may be licensed to sell different types of insurance products, might have different areas of expertise, needs, etc. Thus, an insurance "agent" might refer to one who is appointed by an insurance agency to sell products on its behalf, or may be licensed producers within an insurance agency.

Figure 2:
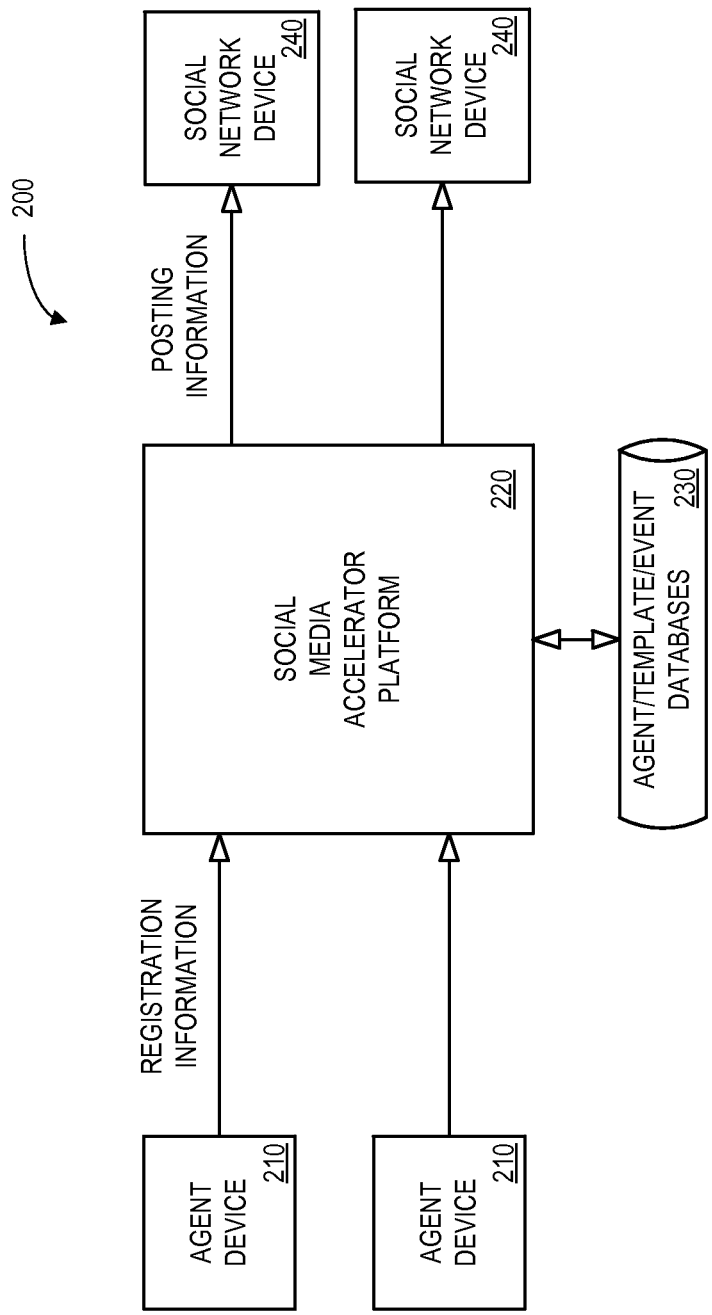
FIG. 2 is block diagram of a system according to some embodiments of the present invention.

FIG. 2 is a block diagram of a system 200 according to some embodiments of the present invention. The system 200 may, for example, facilitate the distribution of information to members of social networking web sites. For exemplary purposes, such sites/networks may include ebay.com, Facebook.com, LinkedIn.com, AngiesList.com, Twitter.com, Blogger.com, MySpace.com, Friendster.com, and other similar sites. In the present invention, a social media accelerator enterprise platform 220 may receive information from remote agent devices 210. The agent devices 210 might comprise, for example, Personal Computers (PCs), laptop computers, and/or wireless telephones that can transmit registration information to the social media accelerator platform 220. Be way of example, an agent device 210 might be associated with an agent's office, vehicle, or smartphone.

According to some embodiments, the "automated" social media accelerator platform 220 may open social network accounts, establish and/or modify social network links, and/or post social network information. As used herein, the term "automated" may refer to, for example, actions that can be performed with little or no human intervention. By way of example only, the social media accelerator platform 220 may be associated and/or communicate with a Personal Computer (PC), an enterprise server, or a database farm. According to some embodiments, the social media accelerator platform 220 is associated with a salesforce automation, a Customer Relationship Management (CRM) application, a Customer Service Manager (CSM)/content management system such as interwoven, Fatwire, etc. The social media accelerator platform 220 may, according to some embodiments, facilitate the establishment of one or more social network accounts based on the registration information received from the agent devices 210 and/or databases 230. Moreover, the social media accelerator platform 220 may facilitate the transmission of posting information to and/or through one or more social network devices 240 (e.g., Facebook servers).

As used herein, devices including those associated with the social media accelerator platform 220, and any other device described herein may exchange information via any communication network 160 which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Note that the social media accelerator platform 220 may be associated with various types of insurance policies, including personal insurance, business insurance, workers compensation, liability insurance, and wealth management offerings, including property and casualty insurance, life insurance, retirement and education investment products, and group benefits offerings.

Although a single social media accelerator platform 220 is shown in FIG. 2, any number of such devices may be included. Moreover, various devices described herein might be combined according to embodiments of the present invention. For example, in some embodiments, the social media accelerator platform 220 and databases 230 might be co-located and/or may comprise a single apparatus.

The social media accelerator platform 220 may also access information in one or more databases 230. The databases 230 may include, for example, agent information (e.g., from a salesforce automation platform), template information, and/or event information. As will be described further below, the databases 230 may be used by the social media accelerator platform 220 to establish social network accounts, for customer/prospect targeting, and/or to distribute posting information.

Figure 3:
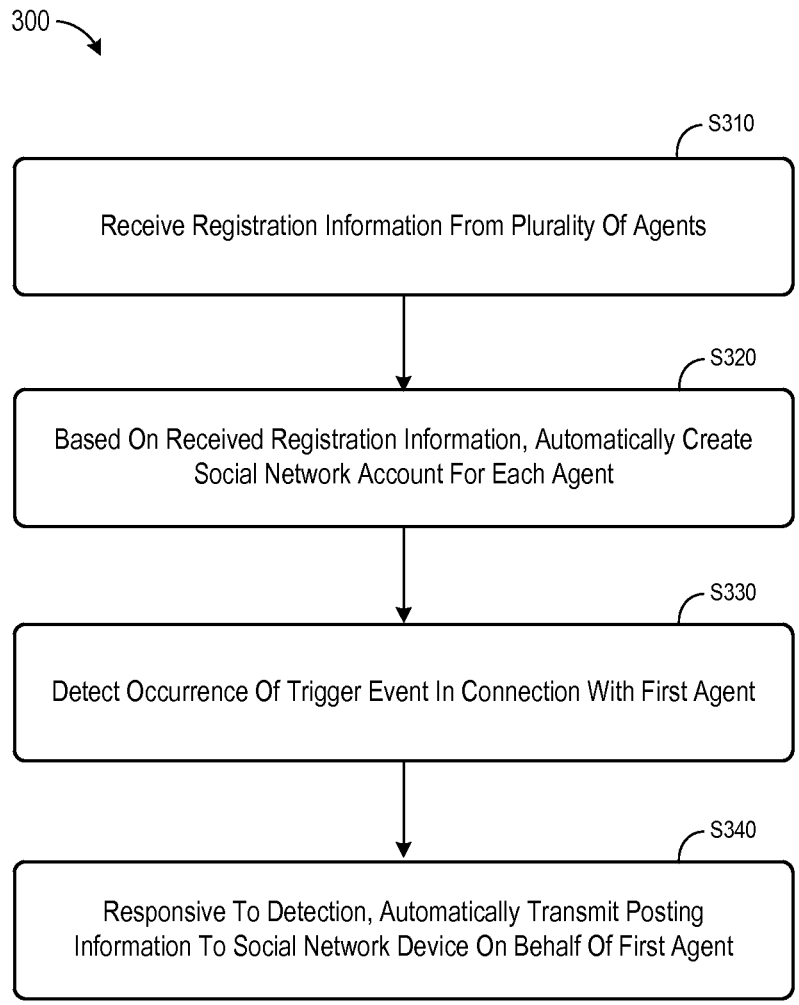
FIG. 3 illustrates a method according to some embodiments of the present invention.

FIG. 3 illustrates a process 300 that might be performed, for example, by some or all of the elements of the system 200 described with respect to FIG. 2 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 300 may be performed to facilitate the distribution of information associated with insurance goods and/or services. Pursuant to some embodiments, at S310 registration information may be received from a plurality of insurance agents (e.g., via remote insurance agent devices). The registration information might, for example, include information about an insurance agent, a list of social networks, potential clients, and/or usernames and passwords associated with social networks.

Figure 4:
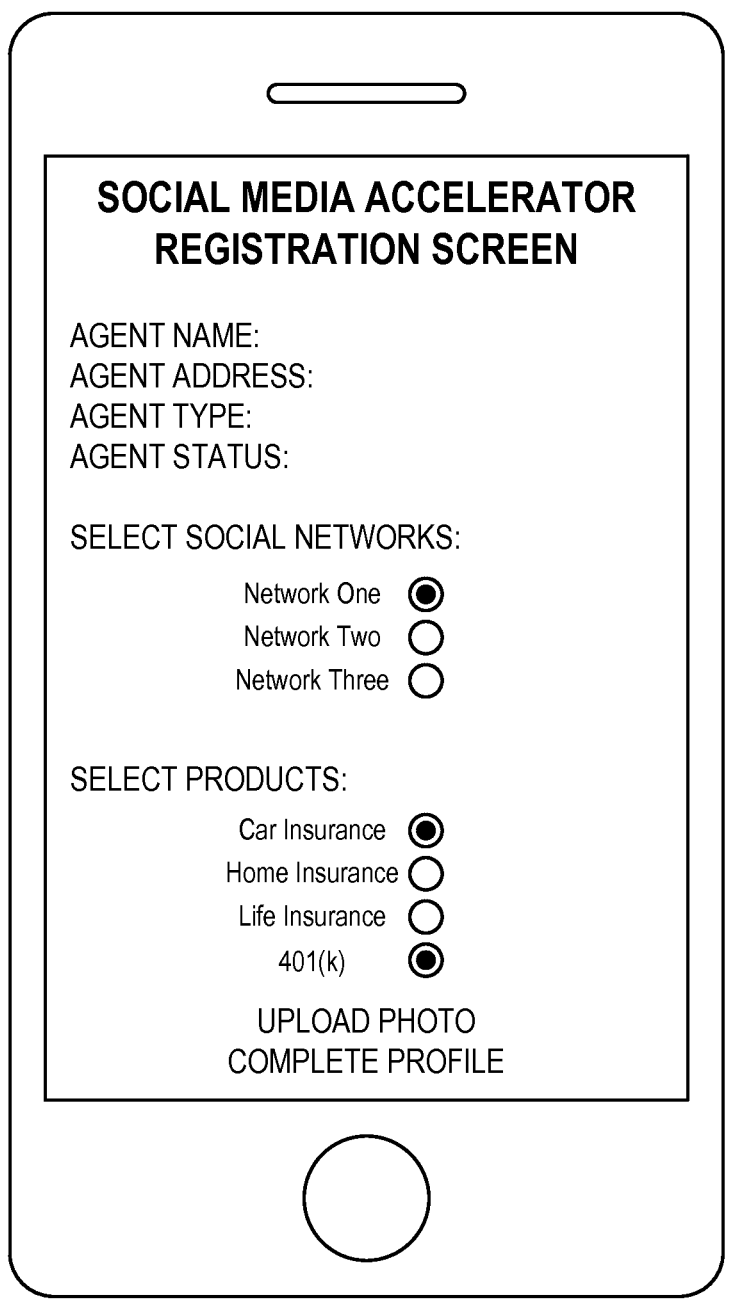
FIG. 4 is an example of an agent registration display on a mobile device according to some embodiments.

FIG. 4 is an example of an agent registration display on a mobile device 410 according to some embodiments. The mobile device 410 may be any of a number of different types of mobile devices that allow for wireless communication and that may be carried with or by a user. For example, in some embodiments, mobile device 104 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity such as a social network server and/or a social media accelerator platform or engine. In addition to name and/or address of the insurance agent, the display lets the agent select one or more social networks and one or more insurance products. Note that according to some embodiments, accounts may be created on a plurality of social networks for each of a plurality of insurance agents (e.g., a platform might manage accounts for thousands of agents).

Figure 5:
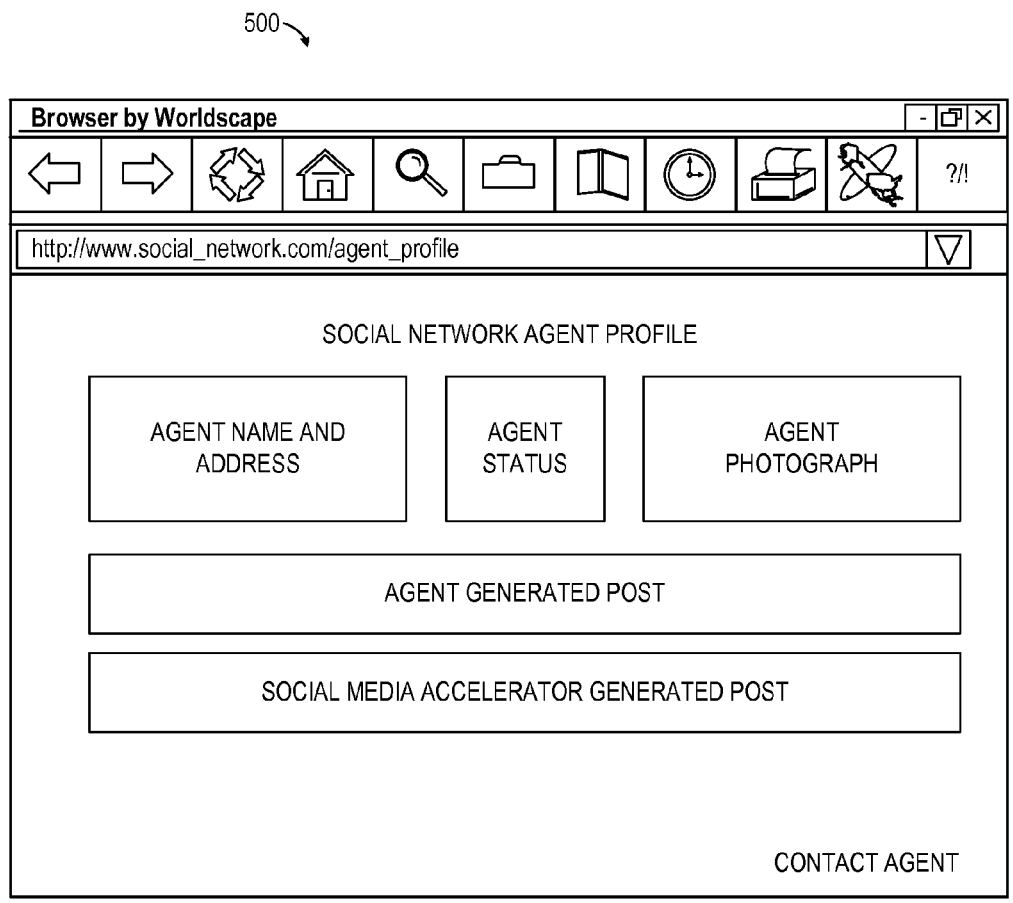
FIG. 5 is an example of a social network agent profile display in accordance with some embodiments.

Referring again to FIG. 3, at S320 a social network account may be automatically created or modified for each agent based on received registration information. For example, accounts might be created using social network account templates. FIG. 5 is an example of a social network agent profile display 500 in accordance with some embodiments. The display 500 includes an agent name and address area, an agent status area (e.g., to display badges or similar items), and an agent photograph. The display 500 further includes both agent generated posts or comments and posts automatically generated by a social media accelerator system. The posting information might be associated with, for example, an insurance product available via the first insurance agent, a current location of the first insurance agent, a future location of the first insurance agent, and/or an insurance agent status of the first insurance agent.

As another example, the posting information might be associated with a news article associated with risk. As still another example, the posting information might be associated with a social network reward to game. For example, a Facebook driving game might feature an agent's name, image, and/or agency name.

Referring again to FIG. 3, at S330 an occurrence of a "trigger event" may be detected. For example, a trigger event might be based on information associated with the insurance agent, such as a static insurance agent location (e.g., his or her office), a dynamic insurance agent location (e.g., indicating that he or she is at a local coffee shop), an insurance agent status, an insurance product available via the insurance agent, profile information associated with the insurance agent, at least one social network relationship of the insurance agent (e.g., a newly added friend or friend of an agent that is also the friend of a prospect), prior sales associated with the insurance agent, licensing information associated with the insurance agent, and/or a number of employees associated with the insurance agent.

According to other embodiments, the trigger event may be based on information associated with a potential insurance customer or prospects of the insurance agent, such as a static potential insurance customer location, a dynamic potential insurance customer location, a potential insurance customer status, at least one social network relationship of the potential insurance customer, demographic information associated with the potential insurance customer (e.g., his or her gender), profile information associated with the potential insurance customer (e.g., marital status, date of birth, gender, interest groups, previous "likes" or other indications of approval, employer, and/or a list of friends), and/or an insurance product associated with the potential insurance customer. According to some embodiments, a customer's interests may be mined using keywords similar to processes used in connection with Search Engine Optimization (SEO) and results may be associated with a trigger event. For example, a customer searching for a dentist, for a small business, or for retirement communities may be targeted to receive information about various types of insurance.

Other examples of potential customer information that may be associated with a trigger event include: a level of education (e.g., might be used in connection with underwriting and/or targeting); a hometown (e.g., might be used to select an agent from the same town); a current location (e.g., to suggest meeting in person); a marital status (e.g., may be related to risk profile); an occupation (e.g., for small commercial underwriting); activities, interests, likes, links, favorite movies and music, and/or status updates (e.g., for targeting).

As still further examples, the trigger event might be based on information associated with an insurance product available via the insurance agent, such as insurance information, an advertising campaign, a location associated with the insurance product, a price associated with the insurance product, a benefit associated with the insurance product, an event associated with the insurance product, and/or an expiration or renewal date. According to some embodiments, a customer's social network "likes" of a product or company might be used to give the customer a loyalty discount or other benefit. As still another example, a trigger event might be associated with a customer "checking" in at a particular location via a social media network (e.g., Facebook places or Foursquare), such as an agent's office or ad advertising campaign location.

Other examples of insurance product information that may be associated with a trigger event include: friends (e.g., adding an agent or insurance provider as a friend might result in an insurance product upgrade); checking in (e.g., an insurance product might be available to potential customers who check in at a gym at least three time per week); and photographs (e.g., people who travel to certain locations might not be eligible for certain insurance products).

Responsive to the detection of the trigger event, at S340 posting information may be transmitted to a social network server on behalf of the insurance agent. The posting information might comprise, for example, text information, image information, audio information, video information, and/or a website link. Examples of posting information may include a status update, a blog entry, a comment, a forum entry, a message associated with at least one social network relationship of the insurance agent, and/or a social network request (e.g., a friend request). Note that the posting information might be customized based on information about the insurance agent, information about a potential customer, and/or information about an insurance product. According to some embodiments, the posting information further includes information about a social network benefit that may be provided to the potential customer (e.g., credit or points that may be spent or otherwise applied in connection with the social network).

Note that posting information might be associated with an advertising campaign for a new insurance product. As other example, the posting information might be associated with a charity drive, a special offer (e.g., get five friends to join and get a 10% discount), a neighbor program, or a contest. According to some embodiments, the posting information might point out an action of a friend that links to the agent to create interest in a particular product. As another example, posting information might indicate that an insurance enterprise will donate a substantial amount of money to a charity selected by potential clients who "like" a particular Facebook post or that a friend already does business with an agent or carrier.

According to some embodiments, social network information associated with a plurality of insurance agents may be aggregated. For example, a number of posts (or comments about posts) may be aggregated. A social media accelerator platform may then display aggregated information to an operator associated with the insurance enterprise. Such a feature might, for example, let an administrator determine how effective a particular campaign is on various social networks. The aggregated information might, for example, include information about insurance product sales, social network activities, and/or social network relationships. The aggregated information might, according to some embodiments be used as a "feedback" mechanism associated with the automatic generation of future posting information.

As a result of the embodiments described herein, an improved system and method may be provided for the distribution of information associated with, for example, personal and business insurance policies may be achieved.

Figure 6:
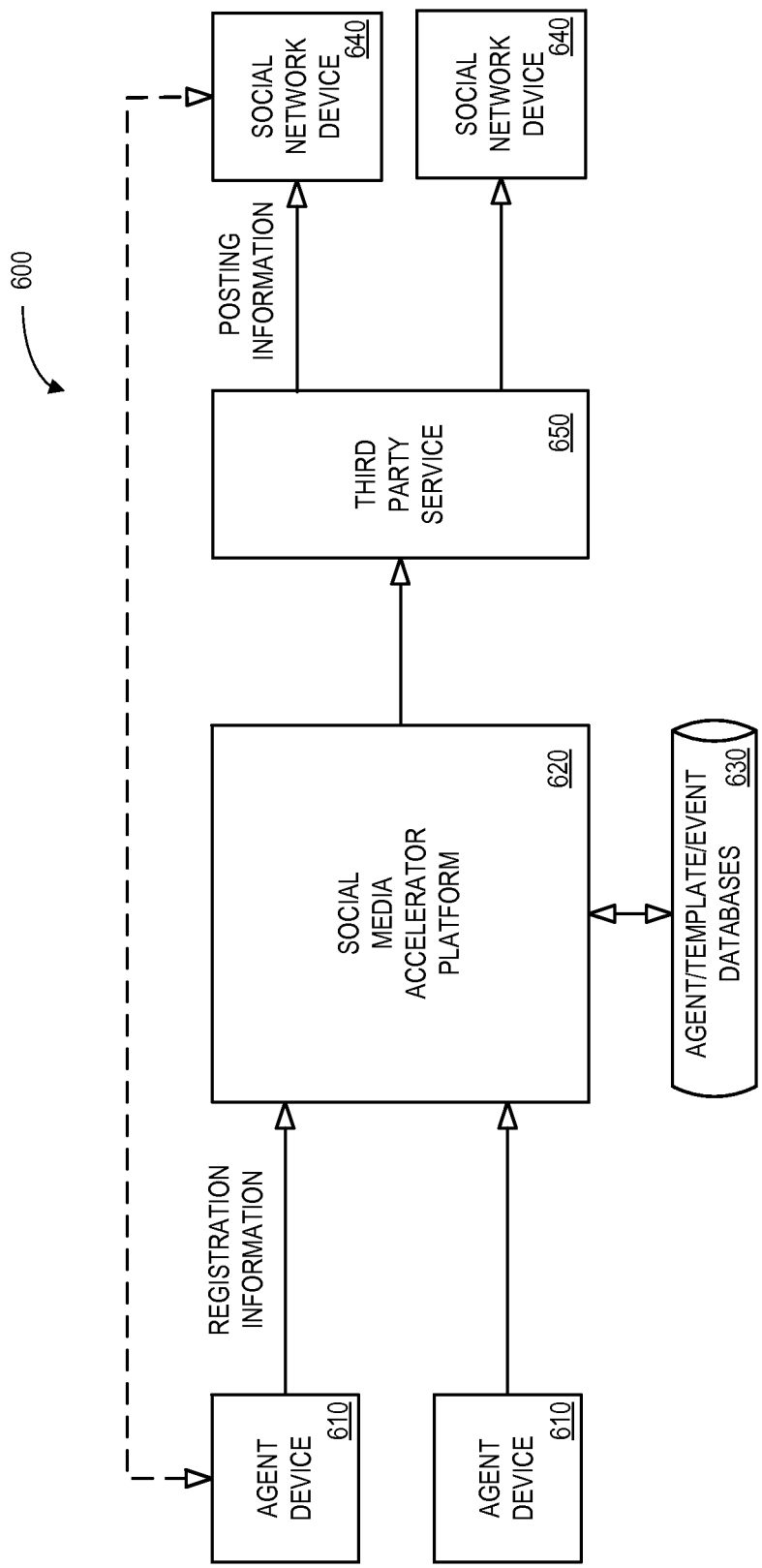
FIG. 6 is block diagram of a system according to another embodiment of the present invention.

The embodiments described herein may be implemented in any number of different ways. For example, FIG. 6 is a block diagram of a system 600 according to another embodiment of the present invention. The system 600 may, for example, facilitate the distribution of information to members of social networking web sites. In particular, a social media accelerator enterprise platform 620 may receive information from remote agent devices 610, such as PCs, laptop computers, and/or wireless telephones that can transmit registration information to the social media accelerator platform 620.

According to some embodiments, the social media accelerator platform 620 may automatically open social network accounts, establish and/or modify social network links, and/or post social network information. By way of example only, the social media accelerator platform 620 may be associated and/or communicate with a PC, an enterprise server, or a database farm. The social media accelerator platform 620 may, according to some embodiments, facilitate the establishment of one or more social network accounts based on the registration information received from the agent devices 610 and/or databases 630. Moreover, the social media accelerator platform 620 may facilitate the transmission of posting information to and/or through one or more social network devices 640. The social network devices 640 might be associated with, for example, Facebook, Twitter, LinkedIn, Foursquare, tumblr, YouTube, flickr, digg, Pandora, last fm, upcoming, mybloglog, slideshare, and/or MySpace. According to some embodiments, a third party service 650 may facilitate communications between the social media accelerator 620 and social network devices 640.

Figure 7:
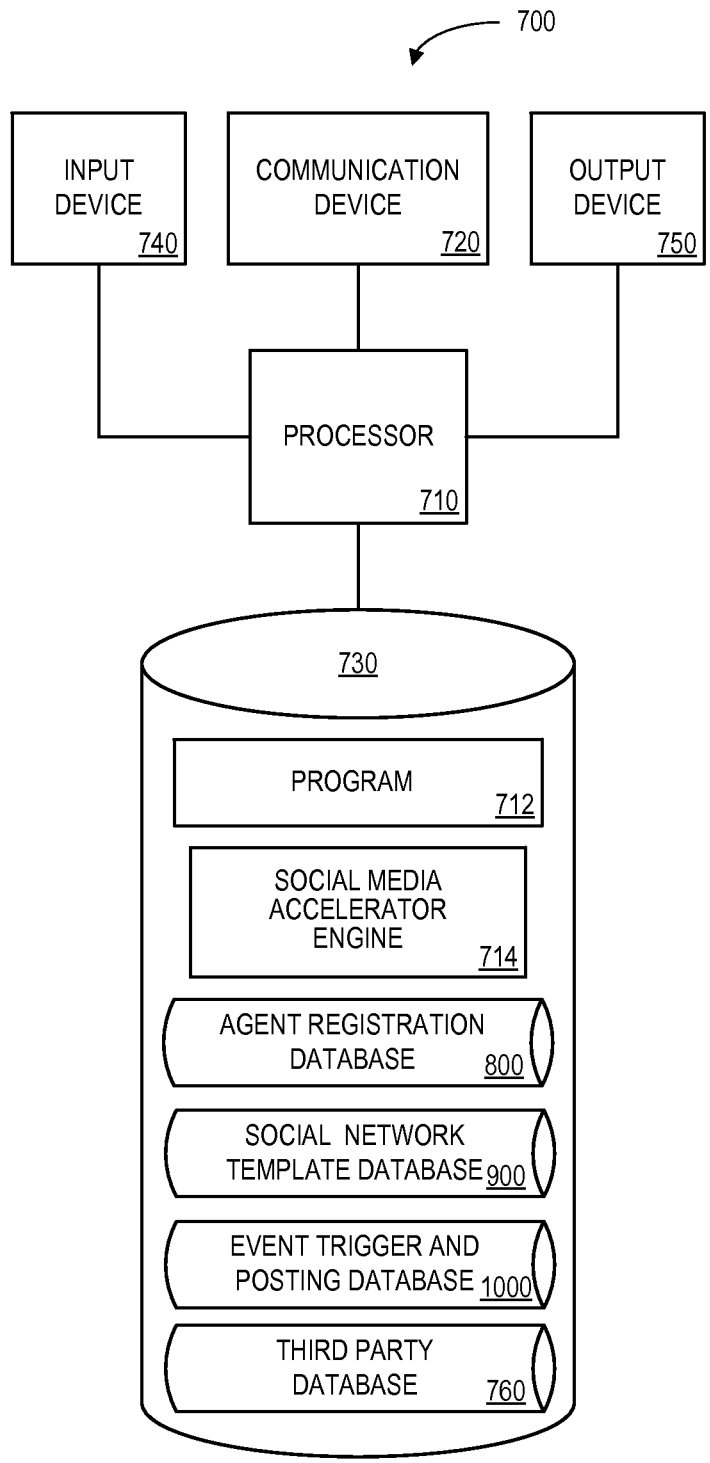
FIG. 7 is an example of a social media accelerator enterprise platform according to some embodiments.

FIG. 7 is a block diagram overview of a social media accelerator platform 700 according to some embodiments. The social media accelerator platform 700 may be, for example, associated with the systems 200, 600 of FIGS. 2 and 6. The social media accelerator platform 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more remote agents or social network servers. The social media accelerator platform 700 further includes an input device 740 (e.g., a mouse and/or keyboard to enter trigger conditions) and an output device 750 (e.g., a computer monitor to display aggregated social network results to an administrator). According to some embodiments, the input device 740 may be associated with a Global Positioning Satellite device that automatically sends status, location, movement data, and/or temperature information to a social network (e.g., Twitter). For example, a telephone owned by a person could automatically tweet location information.

The processor 710 also communicates with a storage device 730. The storage device 730 may comprise any appropriate information storage device, including combinations of magnetic storage devices (e.g., a hard disk drive), optical storage devices, mobile telephones, vehicle computers, and/or semiconductor memory devices. The storage device 730 stores a program 712 and/or social media accelerator engine 714 for controlling the processor 710. The processor 710 performs instructions of the programs 712, 714, and thereby operates in accordance with any of the embodiments described herein. For example, the processor 710 may detect an occurrence of a trigger event in connection with a first insurance agent of the plurality of insurance agents. Responsive to said detection, the processor 710 may automatically arrange for posting information to be transmitted to at least one social network server in connection with the first insurance agent.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the social media accelerator platform 700 from another device; or (ii) a software application or module within the social media accelerator platform 700 from another software application, module, or any other source.

In some embodiments (such as shown in FIG. 7), the storage device 730 stores an agent registration database 800 (described with respect to FIG. 8), a social network template database 900 (described with respect to FIG. 9), and an event trigger and posting database 1000 (described with respect to FIG. 10). According to some embodiments, the storage device 730 further stores a third party database 760. The third party database 760 may, for example, be associated with a Customer Relationship Management (CRM) content management system and/or a salesforce automation application. Examples of some of the databases that may be used in connection with the social media accelerator platform 700 will now be described in detail with respect to FIGS. 8 through 10. Note that the databases described herein are examples, and additional and/or different information may be stored therein. Moreover, various databases might be split or combined in accordance with any of the embodiments described herein. Note that any data field text might be mined for customer targeting (e.g., looking for "AARP" or other terms).

Referring to FIG. 8, a table is shown that represents the agent registration database 800 that may be stored at the social media accelerator platform 700 according to some embodiments. The table may include, for example, entries identifying insurance agents participating in a social network campaign. The table may also define fields 802, 804, 806, 808, 810 for each of the entries. The fields 802, 804, 806, 808, 810 may, according to some embodiments, specify: an agent identifier 802, an agent name 804, an agent 806, selected social networks 808, and selecting insurance products 810. The information in the agent registration database 800 may be created and updated, for example, whenever data is received from remote agent devices. According to some embodiments, the agent registration database 800 may be augmented with information kept in a separate salesforce automation database.

The agent identifier 802 may be, for example, a unique alphanumeric code identifying an insurance agent. The agent name 804 and agent 806 may further identify the insurance agent. The selected social networks 808 may indicate those networks the agent is interested in joining and the selecting insurance products 810 may indicate which products are available from the insurance agent associated with that agent identifier 802 (e.g., automotive, life, 401(k), property, and/or workers compensation insurance). Although only a limited amount of information is illustrated in FIG. 8, note that actual embodiments may include much more information (e.g., how long the agent has been in business, how many employees work for the agent, a number of years an agent has been on a social network, a percentage of customers insured with a carrier, an agents VIP status, or other "badge" associated with a carrier).

FIG. 9 is a tabular portion of social network template database 900 according to some embodiments. The table may include, for example, different layouts of social network pages that could be used in a social network campaign. The table may also define fields 902, 904, 906, 908, 910 for each of the entries. The fields 902, 904, 906, 908, 910 may, according to some embodiments, specify: a template identifier 902, a social network 904, a template element 906, an element location 908, and element data 910. The information in the agent registration database 900 may be created and updated, for example, whenever a new social network campaign is deployed. For example, an agent might receive a new "badge" or higher status on a social media network based on a campaign (e.g., a number of customers that "like" an agent, an agent that posts the most articles, or an agent whose posts are read a predetermined number of times).

The template identifier 802 may be, for example, a unique alphanumeric code identifying a template that can be used to construct a page on the social network 904. The template element 906 may include a portion of the page (e.g., an agent address or photograph) and the element location 908 may indicate where on the page the element should be located. Note that multiple elements 906 may be used to construct a single template (e.g., multiple elements 906 may be associated with a single template identifier 902). The element data 910 may, for example, indicate where the information associated with that element may be found (e.g., from another database or a file location).

FIG. 10 is a tabular portion of an event trigger and posting database 1000 according to some embodiments. The table may include, for example, entries identifying social network posts that have been automatically generated as part of a social network campaign. According to some embodiments, the table may also include social media "app request" data. For example, a user may provide his or her age and whether or not he or she has life insurance in order to play a Facebook game on an agent's social media site. The table may also define fields 1002, 1004, 1006, 1008, 1010 for each of the entries. The fields 1002, 1004, 1006, 1008, 1010 may, according to some embodiments, specify: a posting identifier 1002, a posting trigger 1004, a posting agent identifier 1006, a social network 1008, and posting information 1010. The information in the agent registration database 1000 may be created and updated, for example, whenever data is automatically distributed via a social network via a social media accelerator platform.

The posting identifier 1002 may be, for example, a unique alphanumeric code identifying a social network post that has been automatically generated as part of a social network campaign. The posting trigger 1004 may be associated with a rule or condition that resulted in the post. For example, a person who has a birthday stored in a database may automatically receive a birthday message, photograph, or game from an agent via a social networking site.

The posting trigger 1004 may be, for example, associated with contact information (e.g., name, birthday, and address), profile triggers (e.g., an interest of a potential client), an agent type or appointment such as a National Producer Number (NPN) or code, or a customer or agent behavior (e.g., opening an email or usage of a billing function). According to some embodiments, an agent may establish "preferences" that help define which trigger events are appropriate. For example, a death of a spouse, a change in relationship status listed on a social media database, or a recent "like" of an article about disability insurance might represent a trigger event.

The posting trigger 1004 might also be associated with potential customers, such as a ZIP code, keywords in his or her Facebook entries, group memberships, relationship status, age, gender, birthday, or workplace information. The posting trigger 1004 might also be associated with insurance product information, such as products selected based on the size and nature of a potential customer's business, a number of employees associated with a potential customer, and/or a product renewal date.

The posting agent identifier 1006 may be a unique alphanumeric code indication the party associated with the posting information and may be identical to or based on the agent identifier 802 of the agent registration database 800 described with respect to FIG. 8. The social network 1008 may indicate where the post was published and the posting information 1010 might include the posting information itself.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with insurance products, customer targeting or profiling, wealth protection, wealth accumulation, and/or educational savings. Note, however, that other types of insurance products may also benefit from the invention. For example, embodiments of the present invention may be used financial, medical, educational, and other types of information.

A potential customer's request for social network applications ("apps") and/or use of apps may be used in connection with any of the embodiments described herein. For example, an agent might post a Facebook app that requests targeting or pricing information (e.g., a credit score, a number of accidents, or his or her age) from a potential customer. This information may then be used to generate a quote and/or to send information to the customer via the social network. As another example, a financial calculator type app might help an agent determine information about a small commercial business (e.g., an industry, a number of years in business, a payroll range, a fleet type or size, workers compensation classes, a ZIP code, and/or a frequency of prior accidents) or a commercial account (e.g., a company role, a number of years at a company, a current insurance provider, and/or a line of coverage).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system associated with an insurance enterprise affiliated with a plurality of insurance agents, comprising:
   a data storage device configured to store agent data associated with the plurality of insurance agents and trigger event preference data for a plurality of the insurance agents relating to one or more trigger events for automatic posting of information on a plurality of social media networks associated with each of the plurality of insurance agents;
   a communications device configured to communicate with the data storage device, with a plurality of devices of the plurality of insurance agents, and with servers of the plurality of social media networks;
   a computer processor for executing program instructions and for retrieving said data associated with the plurality of insurance agents from the data storage device; and
   a memory, coupled to the computer processor, for storing program instructions for execution by the computer processor to:
   receive via the communications device registration information from the plurality of insurance agents, and
   based on the received registration information, automatically transmit account creation information to the servers of the plurality of social media networks, the account creation information configured to cause creation of a social media account on each of a plurality of social media networks for each of the plurality of insurance agents;
   receive via the communications device trigger event preferences from the plurality of insurance agents, wherein at least one of the trigger event preferences from a first insurance agent comprises a first location based trigger event relating to a location of the first insurance agent or a location of a potential customer of the first insurance agent, and wherein at least one of the trigger event preferences from a second insurance agent comprises a second location based trigger event relating to a location of the second insurance agent or a location of a potential customer of the second insurance agent;
   store the trigger event preferences for the plurality of insurance agents in the data storage device;
   detect an occurrence of the first location based trigger event in connection with the first insurance agent of the plurality of insurance agents,
   responsive to said detection, automatically transmit posting information to a first social media network server and to a second social media network server, the posting information configured to cause the first social media network server to post the posting information on the first social media network in relation to at least a first social media account for the first insurance agent and configured to cause the second social media network server to post the posting information on the second social media network in relation to at least a second social media account for the first insurance agent;
   detect an occurrence of the second location based trigger event in connection with the second insurance agent of the plurality of insurance agents, and
   responsive to said detection, automatically transmit posting information to a first social media network server and to a second social media network server, the posting information configured to cause the first social media network server to post the posting information on the first social media network in relation to at least a first social media account for the second insurance agent and configured to cause the second social media network server to post the posting information on the second social media network in relation to a second social media account for the second insurance agent.

2. The system of claim 1, wherein the account creation data is associated with a social media network account template.

3. The system of claim 1, wherein the posting information is associated with at least one of: (i) an insurance product available via the first insurance agent, (ii) a current location of the first insurance agent, (iii) a future location of the first insurance agent, (iv) an insurance agent status of the first insurance agent, and (v) an insurance product feature.

4. The system of claim 1, wherein the posting information comprises at least one of: (i) text information, (ii) image information, (iii) audio information, (iv) video information, (v) a website link, (vi) a social connection, or (vii) a like of a person, product, agent, or other item.

5. The system of claim 4, wherein the posting information comprises at least one of: (i) a status update, (ii) a blog entry, (iii) a comment, (iv) a forum entry, (v) a message associated with at least one social media network relationship of the first insurance agent, (vi) a social media network request, or (vii) a social media network connection or like.

6. The system of claim 5, wherein the posting information further includes information about a social media network benefit that may be provided to a potential customer.

7. The system of claim 5, wherein the posting information is customized based on at least one of: (i) information about the first insurance agent, (ii) information about a potential customer, (iii) information about an insurance product, (iv) information received from a device associated with an agent or potential customer.

8. The system of claim 1, wherein the first location based trigger event is based on information associated with the first insurance agent.

9. The system of claim 8, wherein the information associated with the first insurance agent comprises a static or dynamic insurance agent location and at least one social media network relationship of the first insurance agent.

10. The system of claim 1, wherein the trigger event preferences for the first insurance agent further comprises a trigger event based on information associated with an existing or potential insurance customer of the first insurance agent.

11. The system of claim 10, wherein the trigger event based on information associated with the potential insurance customer of the first insurance agent comprises a trigger event based on at least one of: (i) a potential insurance customer status, (ii) at least one social media network relationship of the potential insurance customer, (iii) demographic information associated with the potential insurance customer, (iv) profile information associated with the potential insurance customer, (v) an insurance product associated with the potential insurance customer, or (vi) information provided in connection with a social media application request.

12. The system of claim 10, wherein execution of the program instructions further cause the computer processor to:
facilitate a provision of an interactive application to the potential insurance customer via the first social media network server,
gather social media network profile information associated with the potential insurance customer, and
scoring an insurance product for the potential customer based at least in part on the social media network profile information.

13. The system of claim 12, wherein the interactive application is associated with at least one of: (i) a game, (ii) a survey, (iii) or a calculator.

14. The system of claim 1, wherein the trigger event preferences for the first insurance agent further comprises a trigger event based on information associated with an insurance product available via the first insurance agent.

15. The system of claim 14, wherein the trigger event based on information associated with the insurance product available via the first insurance agent comprises a trigger event based on at least one of: (i) insurance information, (ii) an advertising campaign, (iii) a location associated with the insurance product, (iv) a price associated with the insurance product, (v) a benefit associated with the insurance product, (vi) an event associated with the insurance product, (vii) an expiration or renewal date, (viii) a regulatory change associated with the insurance product, (ix) at least one social media network relationship associated with the insurance product, or (x) whether the insurance product is liked via a social media network.

16. The system of claim 1, wherein execution of the program instructions further cause the computer processor to:
aggregate data relating to social media network posting information by summing values associated with a number of social media network postings automatically posted for the plurality of insurance agents, and
display aggregated information to an operator associated with the insurance enterprise.

17. The system of claim 1, wherein the aggregated information includes information about at least one of: (i) insurance product sales, (ii) social media network activities, or (iii) social media network relationships.

18. The system of claim 1, wherein the social media network server is associated with at least one of: (i) Facebook, (ii) Twitter, (iii) LinkedIn, (iv) Foursquare, (v) tumblr, (vi) YouTube, (vii) flickr, (viii) digg, (ix) last fm, (x) upcoming, (xi) mybloglog, (xii) slideshare, (xiii) MySpace, (xiv) Pandora, or (xv) a third party service associated with a plurality of social media networks.

19. The system of claim 1, wherein the posting information is based at least in part on an insurance provider identifier.

20. A computer-implemented method associated with an insurance enterprise affiliated with a plurality of insurance agents, comprising:
receiving registration information from the plurality of insurance agents via a communications device,
based on the received registration information, automatically transmitting account creation information to servers of a plurality of social media networks, the account creation information configured to cause creation of a social media account on each of the plurality of social media networks for each of the plurality of insurance agents;
receiving trigger event preferences from the plurality of insurance agents via the communications device, wherein at least one of the trigger event preferences from a first insurance agent comprises a first location based trigger event relating to a location of the first insurance agent or a location of a potential customer of the first insurance agent, and wherein at least one of the trigger event preferences from a second insurance agent comprises a second location based trigger event relating to a location of the second insurance agent or a location of a potential customer of the second insurance agent;
storing the trigger event preferences for the plurality of insurance agents in the data storage device;
detecting in a processor an occurrence of the first location based trigger event in connection with the first insurance agent of the plurality of insurance agents;
responsive to said detection in the processor, automatically arranging for posting information to be transmitted via a communication network to a first social media network server and to a second social media network server, the posting information configured to cause the first social media network server to post the posting information on the first social media network in relation to at least a first social media account for the first insurance agent and configured to cause the second social media network server to post the posting information on the second social media network in relation to a second social media account for the first insurance agent;

detecting in the processor an occurrence of the second location based trigger event in connection with the second insurance agent of the plurality of insurance agents; and responsive to said detection in the processor, automatically arranging for posting information to be transmitted via a communication network to the first social media network server and to the second social media network server, the posting information configured to cause the first social media network server to post the posting information on the first social media network in relation to at least a first social media account for the second insurance agent and configured to cause the second social media network server to post the posting information on the second social media network in relation to a second social media account for the second insurance agent.

21. The method of claim 20, wherein the posting information is associated with at least one of: (i) an insurance product available via the first insurance agent, (ii) a current location of the first insurance agent, (iii) a future location of the first insurance agent, (iv) an insurance agent status of the first insurance agent, and (v) an insurance product feature.

22. A non-transitory computer-readable medium storing instructions adapted to be executed by a computer processor to perform a method, said method comprising:

receiving via a communications device registration information from the plurality of insurance agents, based on the received registration information, automatically transmitting account creation information to servers of a plurality of social media networks, the account creation information configured to cause creation of a social media account on each of the plurality of social media networks for each of the plurality of insurance agents;

receiving via the communications device trigger event preferences from the plurality of insurance agents, wherein at least one of the trigger event preferences from a first insurance agent comprises a first location based trigger event relating to a location of the first insurance agent or a location of a potential customer of the first insurance agent, and wherein at least one of the trigger event preferences from a second insurance agent comprises a second location based trigger event relating to a location of the second insurance agent or a location of a potential customer of the second insurance agent;

storing the trigger event preferences for the plurality of insurance agents in the data storage device;

detecting an occurrence of the first location based trigger event in connection with the first insurance agent of a plurality of insurance agents;

responsive to said detection, automatically arranging for posting information to be transmitted to a first social media network server and to a second social media network server, the posting information configured to cause the first social media network server to post the posting information on the first social media network in relation to at least a first social media account for the first insurance agent and configured to cause the second social media network server to post the posting information on the second social media network in relation to a second social media account for the first insurance agent, detecting an occurrence of the second location based trigger event in connection with the second insurance agent of the plurality of insurance agents; and responsive to said detection, automatically arranging for posting information to be transmitted to the first social media network server and to the second social media network server, the posting information configured to cause the first social media network server to post the posting information on the first social media network in relation to at least a first social media account for the second insurance agent and configured to cause the second social media network server to post the posting information on the second social media network in relation to a second social media account for the second insurance agent.

23. The non-transitory computer-readable medium of claim 22, wherein the posting information is customized based on at least one of: (i) information about the first insurance agent, and (ii) information about a potential customer.

* * * * *